US010225052B2

(12) United States Patent
Wu

(10) Patent No.: US 10,225,052 B2
(45) Date of Patent: Mar. 5, 2019

(54) WIRELESS TRANSMISSION PATH SELECTION METHOD AND APPARATUS

(71) Applicant: HUAWEI TECHNOLOGIES CO., LTD., Shenzhen, Guangdong (CN)

(72) Inventor: Yong Wu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 74 days.

(21) Appl. No.: 15/356,998

(22) Filed: Nov. 21, 2016

(65) Prior Publication Data

US 2017/0070321 A1 Mar. 9, 2017

Related U.S. Application Data

(63) Continuation of application No. PCT/CN2014/078133, filed on May 22, 2014.

(51) Int. Cl.
| | |
|---|---|
| *H04W 4/00* | (2018.01) |
| *H04L 5/00* | (2006.01) |
| *H04W 40/12* | (2009.01) |
| *H04W 28/06* | (2009.01) |

(52) U.S. Cl.
CPC ............. *H04L 5/003* (2013.01); *H04W 28/06* (2013.01); *H04W 40/12* (2013.01)

(58) Field of Classification Search
CPC ...... H04L 5/0003; H04W 28/06; H04W 40/12
See application file for complete search history.

(56) References Cited

U.S. PATENT DOCUMENTS

| 2013/0279364 A1 | 10/2013 | Nagata et al. |
| 2013/0279455 A1 | 10/2013 | Park et al. |
| (Continued) | | |

FOREIGN PATENT DOCUMENTS

| CN | 101667858 A | 3/2010 |
| CN | 102035628 A | 4/2011 |
| (Continued) | | |

OTHER PUBLICATIONS

Extended European Search Report dated Mar. 23, 2017 in corresponding European Patent Application No. 14892679.3.
(Continued)

*Primary Examiner* — Maharishi V Khirodhar
(74) *Attorney, Agent, or Firm* — Staas & Halsey LLP

(57) ABSTRACT

The present invention relates to the field of the mobile communications technologies, and in particular, to a wireless transmission path selection method and apparatus. In this solution, according to corresponding precoding information, a CQI of each wireless transmission path and/or orthogonality information of channel propagation directions from any two candidate transmission nodes in a candidate transmission node set to a wireless transmission path selection node are/is determined. Both the precoding information and the orthogonality information of the channel propagation directions are related to spatial beamforming. Therefore, interference imposed by spatial beamforming on a signal is considered during wireless transmission path selection, improving accuracy of a determined wireless transmission path, and improving capacity resource utilization.

18 Claims, 4 Drawing Sheets

(56) References Cited

U.S. PATENT DOCUMENTS

| | | | |
|---|---|---|---|
| 2013/0310019 A1* | 11/2013 | Visotsky | H04B 7/024 455/422.1 |
| 2013/0329646 A1 | 12/2013 | Fukumoto et al. | |
| 2014/0029869 A1 | 1/2014 | Liu et al. | |
| 2014/0036789 A1* | 2/2014 | Miao | H04W 72/04 370/329 |
| 2015/0333813 A1* | 11/2015 | Liu | H04W 72/1247 370/329 |

FOREIGN PATENT DOCUMENTS

| | | | |
|---|---|---|---|
| CN | 102047725 A | 5/2011 | |
| CN | 103052132 A | 4/2013 | |
| CN | 103782522 A | 5/2014 | |
| WO | WO 2012/115229 A1 | 8/2012 | |

OTHER PUBLICATIONS

International Search Report dated Feb. 2, 2015 in corresponding International Patent Application No. PCT/CN2014/078133.
International Search Report dated Feb. 2, 2015 in corresponding International Application No. PCT/CN2014/078133.
Office Action, dated Oct. 15, 2018, in Chinese Application No. 201480068316.2 (7 pp.).

\* cited by examiner

WIRELESS TRANSMISSION PATH SELECTION METHOD AND APPARATUS

CROSS-REFERENCE TO RELATED APPLICATION

This application a continuation of International Patent Application No. PCT/CN2014/078133, filed on May 22, 2014, the disclosure of which is hereby incorporated by reference in its entirety.

TECHNICAL FIELD

The present invention relates to the field of the mobile communications technologies, and in particular, to a wireless transmission path selection method and apparatus.

BACKGROUND

In a network evolution process of an LTE (Long Term Evolution, Long Term Evolution) system or an LTE-A (LTE-advanced, Long Term Evolution Advanced) system of the 3GPP (3rd Generation Partnership Project, 3rd Generation Partnership Project), a trend of evolution from a homogeneous network to a heterogeneous network emerges.

To increase a network coverage capacity, small cell nodes are added to the heterogeneous network on a basis of macro station node coverage. With ever-growing capacity requirements, the small cell nodes are intensively deployed. However, during intensive deployment, a problem of transmitting data of a small cell node to a CN (Core Network, core network) needs to be resolved.

At present, the small cell node in the heterogeneous network may connect to an ideal backhaul node (for example, the "ideal backhaul node" accesses the core network by using a fiber or an extremely high frequency microwave, and capacities of these nodes accessing the core network may be considered as unlimited, thus an "ideal connection") in a wireless transmission access manner, so as to access the core network. However, because an ideal backhaul node used by the small cell node to access the core network is fixed at present (for example, an LTE Rel-10 relay node fixedly selects an ideal backhaul node to access the core network), that is, a backhaul path is fixed, and a service served by each small cell node changes dynamically, load of an ideal backhaul node 1 is relatively high at a particular time point, and load of another ideal backhaul node (such as an ideal backhaul node 2) is relatively low. However, a small cell node associated with the ideal backhaul node 1 still accesses the ideal backhaul node 1, that is, still selects the fixed backhaul path. In this case, the ideal backhaul node 1 cannot well serve all small cells accessing the ideal backhaul node 1, which causes relatively small capacities in some small cell nodes and relatively low data transmission efficiency. The ideal backhaul node 2 is idle in this case. A small cell of the ideal backhaul node 1 cannot reselect a transmission path according to this situation or perform transmission by using the ideal backhaul node 2, resulting in a waste of capacity resources.

For example, as shown in FIG. 1A, at a moment, both a small cell node 1# and a small cell node 2# have high load (that is, all users served by the small cell node 1# and the small cell node 2# have relatively large service transmission requirements). An ideal backhaul node that can be accessed by the small cell node 1# and the small cell node 2# is an ideal backhaul node A. Limited by an air interface capacity, the ideal backhaul node A cannot provide the small cell node 1# and the small cell node 2# with relatively high capacities at the same time. In this case, capacity requirements of the small cell node 1# and the small cell node 2# certainly cannot be met. A small cell node 3# has low load in this case and has not too many capacity requirements, and in this case, an ideal backhaul node B that can be accessed by the small cell node 3# has remaining capacity resources for provision.

To improve a capacity of a small cell node and improve capacity resource utilization, a dynamic wireless transmission path selection method according to a service status of the small cell node is provided. In this case, the small cell node is a wireless transmission path selection node. Certainly, the wireless transmission path may be selected by a small cell node, or may be selected by another node, such as a central control node. For example, when the foregoing example is further used for description, if a capacity requirement of the small cell node 2# cannot be met, instead of selecting a wireless transmission path with the ideal backhaul node A to access the core network, the small cell node 2# may select a wireless transmission path with the ideal backhaul node B to access the core network, which is a wireless transmission path shown by a dashed line in FIG. 1A. The small cell node 2# may also be referred to as a wireless transmission path selection node 2#.

In the prior art, a wireless transmission path selection process for a wireless transmission path selection node is mainly as follows: A propagation loss of each wireless transmission path to the wireless transmission path selection node is determined. Then, assuming that a propagation path is a path corresponding to a signal source and another propagation path is a path corresponding to an interference source, receive power of the "signal source" path and receive power of the "interference source" path are obtained by means of calculation according to path losses and transmit power that are of the corresponding propagation paths. A signal to interference plus noise ratio (SINR) of a wireless transmission path is calculated when the wireless transmission path is assumed as the wireless transmission path on which the signal source is located, and the SINR is used as a channel quality indicator (CQI). A wireless transmission path on which the "signal source" is located and that has a highest CQI or has a highest criterion calculated according to the CQI (for example, a link capacity is obtained according to the CQI and available bandwidth information) is used as a target wireless transmission path, so as to access the core network by using the target wireless transmission path. However, because only a propagation loss is considered during wireless transmission path selection, in this method, there is a disadvantage of relatively low accuracy of a selected wireless transmission path due to a relatively large deviation of a calculated CQI.

Certainly, in practical application, a wireless transmission path also needs to be selected in another application scenario. For example, during peer-to-peer mesh network transmission, each node that forms the mesh network may find a path with highest transmission efficiency by means of dynamic wireless transmission path selection; or in device-to-device (D2D) application, a source terminal user node needs to select a path with highest transmission efficiency to arrive at a terminal user node. In the foregoing example, if a node has a multi-antenna capability (for example, the node is configured with 4 antennas) and only a propagation loss is considered during wireless transmission path selection, there is still a disadvantage of relatively low accuracy of a selected wireless transmission path due to a relatively large deviation of a calculated CQI.

In conclusion, a disadvantage of inaccuracy of a determined wireless transmission path and relatively low resource utilization exists in the existing wireless transmission path selection method.

SUMMARY

Embodiments of the present invention provide a wireless transmission path selection method and apparatus, to resolve a disadvantage in the prior art of inaccuracy of a determined wireless transmission path and relatively low resource utilization.

Specific technical solutions provided in the embodiments of the present invention are as follows:

According to a first aspect, a wireless transmission path selection method is provided, including:

determining precoding information of a transmission path between a wireless transmission path selection node and each candidate transmission node in a candidate transmission node set corresponding to the wireless transmission path selection node, and/or orthogonality information of channel propagation directions from any two candidate transmission nodes in the candidate transmission node set to the wireless transmission path selection node, where each candidate transmission node in the candidate transmission node set and the wireless transmission path selection node access a same central control node;

calculating, for each candidate transmission node, a channel quality indicator CQI of the transmission path between the candidate transmission node and the wireless transmission path selection node according to the determined precoding information and/or determined orthogonality information that are/is corresponding to the candidate transmission node; and determining a target transmission path of the wireless transmission path selection node according to the calculated CQI of the transmission path between each candidate transmission node and the wireless transmission path selection node.

With reference to the first aspect, in a first possible implementation manner, the determining precoding information of a transmission path between a wireless transmission path selection node and each candidate transmission node in a candidate transmission node set corresponding to the wireless transmission path selection node specifically includes:

for a transmission path between the wireless transmission path selection node and any candidate transmission node in the candidate transmission node set corresponding to the wireless transmission path selection node, separately performing the following operations:

determining a precoding indicator number of the transmission path; and determining precoding information of the transmission path according to the determined precoding indicator number and a correspondence between a precoding indicator number and precoding information.

With reference to the first aspect or the first possible implementation manner of the first aspect, in a second possible implementation manner, the precoding information includes receive end precoding information and/or transmit end precoding information; and the precoding indicator number includes a receive end precoding indicator number and/or a transmit end precoding indicator number.

With reference to the first aspect or the first to the second possible implementation manners of the first aspect, in a third possible implementation manner, the determining precoding information of a transmission path between a wireless transmission path selection node and each candidate transmission node in a candidate transmission node set corresponding to the wireless transmission path selection node specifically includes:

sending a measurement feedback mode indication to the wireless transmission path selection node;

receiving a receive end precoding indicator number and/or a transmit end precoding indicator number that are/is of a transmission path between a candidate transmission node in the candidate transmission node set corresponding to the wireless transmission path selection node and the wireless transmission path selection node and that are/is fed back by the wireless transmission path selection node according to the measurement feedback mode indication; and determining, according to a corresponding receive end precoding indicator number and/or a corresponding transmit end precoding indicator number, the precoding information of the transmission path between the wireless transmission path selection node and each candidate transmission node in the candidate transmission node set corresponding to the wireless transmission path selection node.

With reference to the second to the third possible implementation manners of the first aspect, in a fourth possible implementation manner, the receive end precoding information includes left singular vector information and/or left singular matrix information that are/is of the channel matrix from the candidate transmission node in the candidate transmission node set to the wireless transmission path selection node; and the receive end precoding indicator number includes a left singular vector indicator number and/or a left singular matrix indicator number that are/is of the channel matrix from the candidate transmission node in the candidate transmission node set to the wireless transmission path selection node.

With reference to the second to the fourth possible implementation manners of the first aspect, in a fifth possible implementation manner, the transmit end precoding information includes right-left singular vector information and/or right singular matrix information that are/is of the channel matrix from the candidate transmission node in the candidate transmission node set to the wireless transmission path selection node; and the transmit end precoding indicator number includes a right singular vector indicator number and/or a right singular matrix indicator number that are/is of the channel matrix from the candidate transmission node in the candidate transmission node set to the wireless transmission path selection node.

With reference to the first to the fifth possible implementation manners of the first aspect, in a sixth possible implementation manner, the determining a precoding indicator number of the transmission path specifically includes:

determining a receive end precoding indicator number of the transmission path according to array configuration information of the wireless transmission path selection node; and/or determining a transmit end precoding indicator number of the transmission path according to array configuration information of a candidate transmission node corresponding to the transmission path.

With reference to the sixth possible implementation manner of the first aspect, in a seventh possible implementation manner, the array configuration information includes:

an array configuration identifier and a total quantity of array antenna ports; or an array configuration identifier, a quantity of horizontal array ports, and a quantity of vertical array ports; or an array configuration identifier, a quantity of x-dimensional array ports, a quantity of y-dimensional array ports, and a quantity of z-dimensional array ports.

With reference to the seventh possible implementation manner of the first aspect, in an eighth possible implementation manner, the array configuration information further includes an array configuration information attribute identifier, and the array configuration information attribute identifier is used to indicate information included in the array configuration information.

With reference to the first aspect, in a ninth possible implementation manner, the determining orthogonality information of channel propagation directions from any two candidate transmission nodes in the candidate transmission node set to the wireless transmission path selection node specifically includes:

separately determining, for any transmission path, receive end precoding information of the any transmission path;

obtaining an orthogonality indicator number of the channel propagation directions from the any two candidate transmission nodes to the wireless transmission path selection node according to receive end precoding information of corresponding transmission paths; and determining the orthogonality information of the channel propagation directions from the any two candidate transmission nodes to the wireless transmission path selection node according to the orthogonality indicator number of the channel propagation directions and a correspondence between an orthogonality indicator number and orthogonality information.

With reference to the first aspect, in a tenth possible implementation manner, the determining orthogonality information of channel propagation directions from any two candidate transmission nodes in the candidate transmission node set to the wireless transmission path selection node specifically includes:

sending a measurement feedback mode indication to the wireless transmission path selection node;

receiving an orthogonality indicator number that is of the channel propagation directions from the any two candidate transmission nodes in the candidate transmission node set to the wireless transmission path selection node and that is fed back by the wireless transmission path selection node according to the measurement feedback mode indication; and determining the orthogonality information of the channel propagation directions from the any two candidate transmission nodes to the wireless transmission path selection node according to the orthogonality indicator number of the channel propagation directions and a correspondence between an orthogonality indicator number and orthogonality information.

With reference to the ninth to the tenth possible implementation manners of the first aspect, in an eleventh possible implementation manner, the orthogonality information of the channel propagation directions includes:

a modulus value of an inner product result of left singular vectors corresponding to maximum singular values of channel matrices from either of the two candidate transmission nodes to the wireless transmission path selection node; and/or a modulus value of an inner product result of right singular vectors corresponding to maximum singular values of channel matrices from the wireless transmission path selection node to either of the two candidate transmission nodes.

With reference to the eleventh possible implementation manner of the first aspect, in a twelfth possible implementation manner, the orthogonality indicator number of the channel propagation directions includes:

a modulus value indicator number of the inner product result of the left singular vectors corresponding to the maximum singular values of the channel matrices from either of the two candidate transmission nodes to the wireless transmission path selection node; or a modulus value indicator number of the inner product result of the right singular vectors corresponding to the maximum singular values of the channel matrices from the wireless transmission path selection node to either of the two candidate transmission nodes.

With reference to the first aspect or the first to the twelfth possible implementation manners of the first aspect, in a thirteenth possible implementation manner, the calculating a CQI of the transmission path according to the determined precoding information and/or determined orthogonality information that are/is corresponding to the candidate transmission node specifically includes:

generating, according to the determined precoding information and/or the determined orthogonality information that are/is corresponding to the candidate transmission node, a receive end orthogonality value of channels from an interference source and a signal source to the wireless transmission path selection node and a transmit end orthogonality value of channels from the interference source to the wireless transmission path selection node and a serving node of the interference source;

calculating a signal to interference plus noise ratio SINR of the transmission path according to the generated receive end orthogonality value of the channels and the generated transmit end orthogonality value of the channels; and determining the CQI of the transmission path according to the SINR obtained by means of calculation; where both the receive end orthogonality value of the channels and the transmit end orthogonality value of the channels are in a negative correlation to the SINR.

With reference to the first aspect or the first to the twelfth possible implementation manners of the first aspect, in a fourteenth possible implementation manner, the calculating a CQI of the transmission path according to the determined precoding information and/or determined orthogonality information that are/is corresponding to the candidate transmission node specifically includes:

generating, according to the determined precoding information and/or the determined orthogonality information that are/is corresponding to the candidate transmission node, a receive end orthogonality value of channels from the wireless transmission path selection node and an interference source to a target node and a transmit end orthogonality value of channels from the interference source to the target node and a serving node of the interference source;

calculating a signal to interference plus noise ratio SINR of the transmission path according to the generated receive end orthogonality value of the channels and the generated transmit end orthogonality value of the channels; and determining the CQI of the transmission path according to the SINR obtained by means of calculation; where both the receive end orthogonality value of the channels and the transmit end orthogonality value of the channels are in a negative correlation to the SINR.

With reference to the first aspect or the first to the fourteenth possible implementation manners of the first aspect, in a fifteenth possible implementation manner, the determining a target transmission path of the wireless transmission path selection node specifically includes:

using a transmission path corresponding to a maximum CQI as the target transmission path of the wireless transmission path selection node; or calculating a maximum throughput of each transmission path according to the CQI of the transmission path between each candidate transmission node and the wireless transmission path selection node and according to a preset rule; and using a transmission path corresponding to a maximum throughput as the target transmission path of the wireless transmission path selection node.

According to a second aspect, a wireless transmission path selection apparatus is provided, including:

a first determining unit, configured to determine precoding information of a transmission path between a wireless transmission path selection node and each candidate transmission node in a candidate transmission node set corresponding to the wireless transmission path selection node, and/or orthogonality information of channel propagation directions from any two candidate transmission nodes in the candidate transmission node set to the wireless transmission path selection node, where each candidate transmission node in the candidate transmission node set and the wireless transmission path selection node access a same central control node;

a calculation unit, configured to calculate, for each candidate transmission node, a channel quality indicator CQI of the transmission path between the candidate transmission node and the wireless transmission path selection node according to the determined precoding information and/or determined orthogonality information that are/is corresponding to the candidate transmission node; and a second determining unit, configured to determine a target transmission path of the wireless transmission path selection node according to the calculated CQI of the transmission path between each candidate transmission node and the wireless transmission path selection node.

With reference to the second aspect, in a first possible implementation manner, the first determining unit is specifically configured to:

for a transmission path between the wireless transmission path selection node and any candidate transmission node in the candidate transmission node set corresponding to the wireless transmission path selection node, separately perform the following operations:

determining a precoding indicator number of the transmission path; and determining precoding information of the transmission path according to the determined precoding indicator number and a correspondence between a precoding indicator number and precoding information.

With reference to the second aspect or the first possible implementation manner of the second aspect, in a second possible implementation manner, the precoding information determined by the first determining unit includes receive end precoding information and/or transmit end precoding information; and the precoding indicator number determined by the first determining unit includes a receive end precoding indicator number and/or a transmit end precoding indicator number.

With reference to the second aspect or the first to the second possible implementation manners of the second aspect, in a third possible implementation manner, the first determining unit is specifically configured to:

send a measurement feedback mode indication to the wireless transmission path selection node;

receive a receive end precoding indicator number and/or a transmit end precoding indicator number that are/is of a transmission path between a candidate transmission node in the candidate transmission node set corresponding to the wireless transmission path selection node and the wireless transmission path selection node and that are/is fed back by the wireless transmission path selection node according to the measurement feedback mode indication; and determine, according to a corresponding receive end precoding indicator number and/or a corresponding transmit end precoding indicator number, the precoding information of the transmission path between the wireless transmission path selection node and each candidate transmission node in the candidate transmission node set corresponding to the wireless transmission path selection node.

With reference to the second to the third possible implementation manners of the second aspect, in a fourth possible implementation manner, the receive end precoding information included in the precoding information determined by the first determining unit includes left singular vector information and/or left singular matrix information that are/is of a channel matrix from the candidate transmission node in the candidate transmission node set to the wireless transmission path selection node; and the receive end precoding indicator number included in the precoding indicator number determined by the first determining unit includes a left singular vector indicator number and/or a left singular matrix indicator number that are/is of the channel matrix from the candidate transmission node in the candidate transmission node set to the wireless transmission path selection node.

With reference to the second to the fourth possible implementation manners of the second aspect, in a fifth possible implementation manner, the transmit end precoding information included in the precoding information determined by the first determining unit includes right-left singular vector information and/or right singular matrix information that are/is of the channel matrix from the candidate transmission node in the candidate transmission node set to the wireless transmission path selection node; and the transmit end precoding indicator number included in the precoding indicator number determined by the first determining unit includes a right singular vector indicator number and/or a right singular matrix indicator number that are/is of the channel matrix from the candidate transmission node in the candidate transmission node set to the wireless transmission path selection node.

With reference to the first to the fifth possible implementation manners of the second aspect, in a sixth possible implementation manner, that the first determining unit determines the precoding indicator number of the transmission path is specifically:

determining a receive end precoding indicator number of the transmission path according to array configuration information of the wireless transmission path selection node; and/or determining a transmit end precoding indicator number of the transmission path according to array configuration information of a candidate transmission node corresponding to the transmission path.

With reference to the sixth possible implementation manner of the second aspect, in a seventh possible implementation manner, the array configuration information used when the first determining unit determines the precoding indicator number of the transmission path includes:

an array configuration identifier and a total quantity of array antenna ports; or an array configuration identifier, a quantity of horizontal array ports, and a quantity of vertical array ports; or an array configuration identifier, a quantity of x-dimensional array ports, a quantity of y-dimensional array ports, and a quantity of z-dimensional array ports.

With reference to the seventh possible implementation manner of the second aspect, in an eighth possible implementation manner, the array configuration information used when the first determining unit determines the precoding indicator number of the transmission path further includes an array configuration information attribute identifier, and the array configuration information attribute identifier is used to indicate information included in the array configuration information.

With reference to the second aspect, in a ninth possible implementation manner, the first determining unit is specifically configured to:

separately determine, for any transmission path, receive end precoding information of the any transmission path;

obtain an orthogonality indicator number of the channel propagation directions from the any two candidate transmission nodes to the wireless transmission path selection node according to receive end precoding information of corresponding transmission paths; and determine the orthogonality information of the channel propagation directions from the any two candidate transmission nodes to the wireless transmission path selection node according to the orthogonality indicator number of the channel propagation directions and a correspondence between an orthogonality indicator number and orthogonality information.

With reference to the second aspect, in a tenth possible implementation manner, the first determining unit is specifically configured to:

send a measurement feedback mode indication to the wireless transmission path selection node;

receive an orthogonality indicator number that is of the channel propagation directions from the any two candidate transmission nodes in the candidate transmission node set to the wireless transmission path selection node and that is fed back by the wireless transmission path selection node according to the measurement feedback mode indication; and determine the orthogonality information of the channel propagation directions from the any two candidate transmission nodes to the wireless transmission path selection node according to the orthogonality indicator number of the channel propagation directions and a correspondence between an orthogonality indicator number and orthogonality information.

With reference to the ninth to the tenth possible implementation manners of the second aspect, in an eleventh possible implementation manner, the orthogonality information of the channel propagation directions that is determined by the first determining unit includes:

a modulus value of an inner product result of left singular vectors corresponding to maximum singular values of channel matrices from either of the two candidate transmission nodes to the wireless transmission path selection node; and/or a modulus value of an inner product result of right singular vectors corresponding to maximum singular values of channel matrices from the wireless transmission path selection node to either of the two candidate transmission nodes.

With reference to the eleventh possible implementation manner of the second aspect, in a twelfth possible implementation manner, the orthogonality indicator number of the channel propagation directions that is determined by the first determining unit includes:

a modulus value indicator number of the inner product result of the left singular vectors corresponding to the maximum singular values of the channel matrices from either of the two candidate transmission nodes to the wireless transmission path selection node; or a modulus value indicator number of the inner product result of the right singular vectors corresponding to the maximum singular values of the channel matrices from the wireless transmission path selection node to either of the two candidate transmission nodes.

With reference to the second aspect or the first to the twelfth possible implementation manners of the second aspect, in a thirteenth possible implementation manner, the calculation unit is specifically configured to:

generate, according to the determined precoding information and/or the determined orthogonality information that are/is corresponding to the candidate transmission node, a receive end orthogonality value of channels from an interference source and a signal source to the wireless transmission path selection node and a transmit end orthogonality value of channels from the interference source to the wireless transmission path selection node and a serving node of the interference source;

calculate a signal to interference plus noise ratio SINR of the transmission path according to the generated receive end orthogonality value of the channels and the generated transmit end orthogonality value of the channels; and determine the CQI of the transmission path according to the SINR obtained by means of calculation; where both the receive end orthogonality value of the channels and the transmit end orthogonality value of the channels are in a negative correlation to the SINR.

With reference to the second aspect or the first to the twelfth possible implementation manners of the second aspect, in a fourteenth possible implementation manner, the calculation unit is specifically configured to:

generate, according to the determined precoding information and/or the determined orthogonality information that are/is corresponding to the candidate transmission node, a receive end orthogonality value of channels from the wireless transmission path selection node and an interference source to a target node and a transmit end orthogonality value of channels from the interference source to the target node and a serving node of the interference source;

calculate a signal to interference plus noise ratio SINR of the transmission path according to the generated receive end orthogonality value of the channels and the generated transmit end orthogonality value of the channels; and determine the CQI of the transmission path according to the SINR obtained by means of calculation; where both the receive end orthogonality value of the channels and the transmit end orthogonality value of the channels are in a negative correlation to the SINR.

With reference to the second aspect or the first to the fourteenth possible implementation manners of the second aspect, in a fifteenth possible implementation manner, the second determining unit is specifically configured to:

use a transmission path corresponding to a maximum CQI as the target transmission path of the wireless transmission path selection node; or calculate a maximum throughput of each transmission path according to the CQI of the transmission path between each candidate transmission node and the wireless transmission path selection node and according to a preset rule; and use a transmission path corresponding to a maximum throughput as the target transmission path of the wireless transmission path selection node.

According to a wireless transmission path selection method in the prior art, during wireless transmission path selection, only a propagation loss is considered, and a capability of avoiding signal interference by spatial beamforming is not considered. Therefore, a transmission path selected according to this selection criterion may impose maximum interference on a wireless transmission path selection node, and a disadvantage of relatively low accuracy of the selected wireless transmission path exists in the method. In the embodiments of the present invention, during wireless transmission path selection, precoding information of a transmission path between a wireless transmission path selection node and each candidate transmission node in a candidate transmission node set corresponding to the wireless transmission path selection node and/or orthogonality information of channel propagation directions from any two candidate transmission nodes in the candidate transmission node set to the wireless transmission path selection node are/is determined, where each candidate transmission node in the candidate transmission node set and the wireless transmission path selection node access a same central control node; for each candidate transmission node, a channel quality indicator CQI of the transmission path between the candidate transmission node and the wireless transmission path selection node is calculated according to the determined precoding information and/or determined orthogonality information that are/is corresponding to the candidate transmission node; and a target transmission path of the wireless transmission path selection node is determined according to the calculated CQI of the transmission path between each candidate transmission node and the wireless transmission path selection node. The precoding information and the orthogonality information of the channel transmission directions are related to the spatial beamforming. Therefore, interference imposed by the spatial beamforming on a signal is considered during wireless transmission path selection, the transmission path selected according to this selection criterion imposes minimum interference on the wireless transmission path selection node. In this method, therefore, accuracy of a determined wireless transmission path is improved, and resource utilization is improved.

DESCRIPTION OF EMBODIMENTS

To make the objectives, technical solutions, and advantages of the embodiments of the present invention clearer, the following clearly and describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Because only a propagation loss is considered during wireless transmission path selection, and a capability of avoiding signal interference by spatial beamforming is not considered in the foregoing method when a small cell node has a multi-antenna capability, a transmission path selected according to this selection criterion may impose maximum interference on a wireless transmission path selection node. Therefore, this method has a disadvantage of relatively low accuracy of a selected wireless transmission path due to a relatively large deviation of a calculated CQI.

Figure 1A:
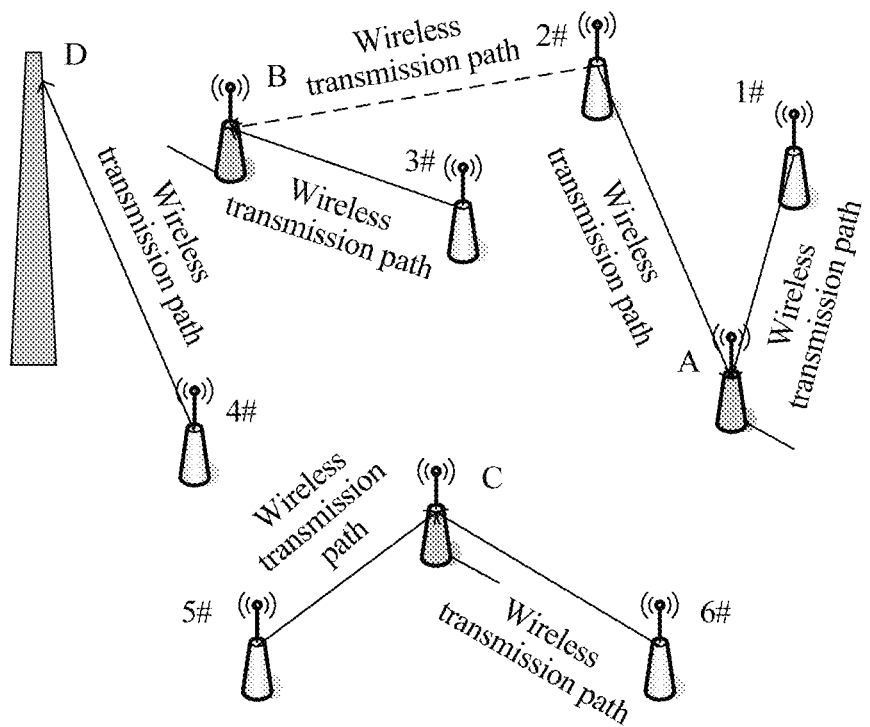
FIG. 1A is a schematic diagram of a wireless transmission path in the prior art.
Figure 1B:
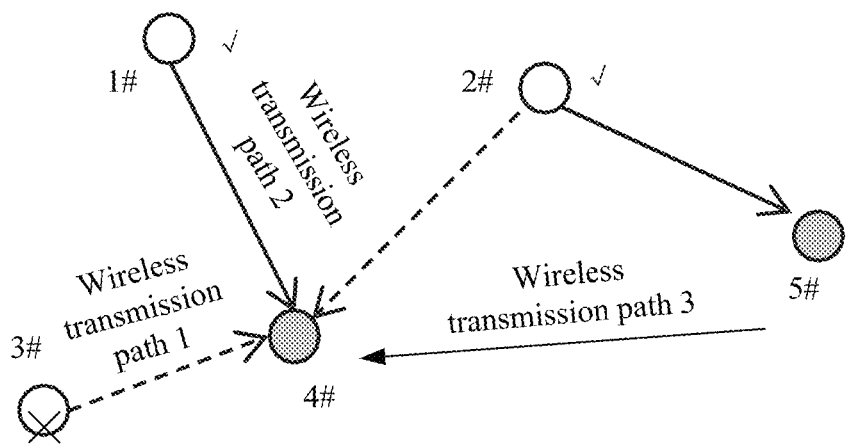
FIG. 1B is a schematic diagram of selection of a wireless transmission path in a specification of the prior art.

For example, in FIG. 1B, a small cell node 4# and a small cell node 5# have accessed a small cell node 2#. Therefore, there are three wireless transmission paths that can be selected by the small cell node 4#: a wireless transmission path 1 between the small cell node 4# and a small cell node 3#, a wireless transmission path 2 between the small cell node 4# and a small cell node 1#, and a wireless transmission path 4 between the small node 4# and the small cell node 5#. The small cell node 4# is a wireless transmission path selection node. Because a distance between the small cell node 4# and the small cell node 3# is shortest, a calculated propagation loss of the wireless transmission path 1 between the small cell node 4# and the small cell node 3# is minimum, and an SINR or a CQI measured by the small cell node 4# for the small cell node 3# may be highest without considering impact of the spatial beamforming. However, if the small cell node 3# is selected to access a core network, because a direction of sending a signal from the small cell node 3# to the small cell node 4# is the same as that of sending an interference signal from the small cell node 2# to the small cell node 4#, the small cell node 4# cannot suppress interference from the small cell node 2# by using effective beamforming at the receive end. As a result, the interference signal sent by the small cell node 2# may impose interference on the signal that is received by the small cell node 4# and that is sent by the small cell node 3#, so that the small cell node 4# has a relatively low capacity.

To resolve a disadvantage in the prior art that a determined wireless transmission path is inaccurate and a resource utilization is relatively low, the embodiments of the present invention provides a wireless transmission path selection method. The method includes: determining precoding information of a channel of a transmission path between a wireless transmission path selection node and each candidate transmission node in a candidate transmission node set corresponding to the wireless transmission path selection node, and/or orthogonality information of channel propagation directions from any two candidate transmission nodes in the candidate transmission node set to the wireless transmission path selection node, where each candidate transmission node in the candidate transmission node set and the wireless transmission path selection node access a same central control node; calculating a CQI of each transmission path according to the precoding information corresponding to the channel from each candidate transmission node in the candidate transmission node set to the wireless transmission path selection node and/or the orthogonality information of the channel propagation directions from the any two candidate transmission nodes in the candidate transmission node set to the wireless transmission path selection node; and determining a target transmission path of the wireless transmission path selection node according to the calculated CQI. In this solution, the CQI of each wireless transmission path is determined according to the corresponding precoding information and/or the corresponding orthogonality information of the channel propagation directions. The precoding information and/or the orthogonality information of the channel propagation directions are/is related to spatial beamforming. Therefore, interference imposed by the spatial beamforming on a signal is considered during wireless transmission path selection, improving accuracy of the determined wireless transmission path, and improving capacity resource utilization.

In the following, preferred implementation manners of the present invention are described in detail with reference to the accompanying drawings. It should be understood that the preferred embodiments described herein are merely used to illustrate and explain the present invention, but are not intended to limit the present invention. In addition, the embodiments of the present application and features in the embodiments may be mutually combined if they do not conflict with each other.

In the following, the preferred implementation manners of the present invention are described in detail with reference to the accompanying drawings.

Figure 2A:
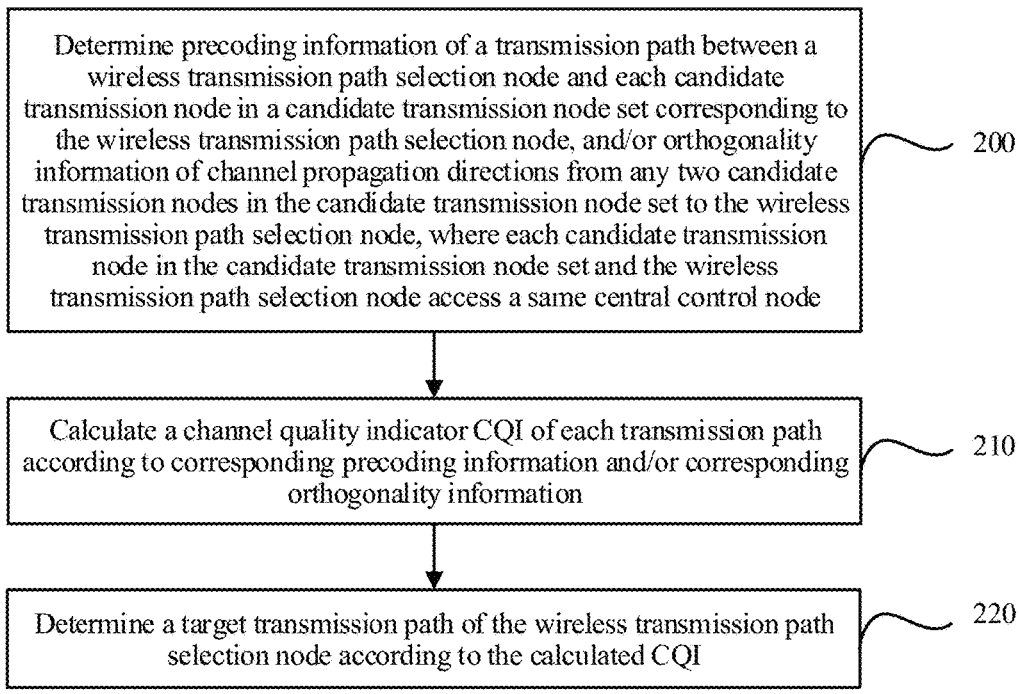
FIG. 2A is a detailed flowchart of selection of a wireless transmission path according to an embodiment of the present invention.
Figure 2B:
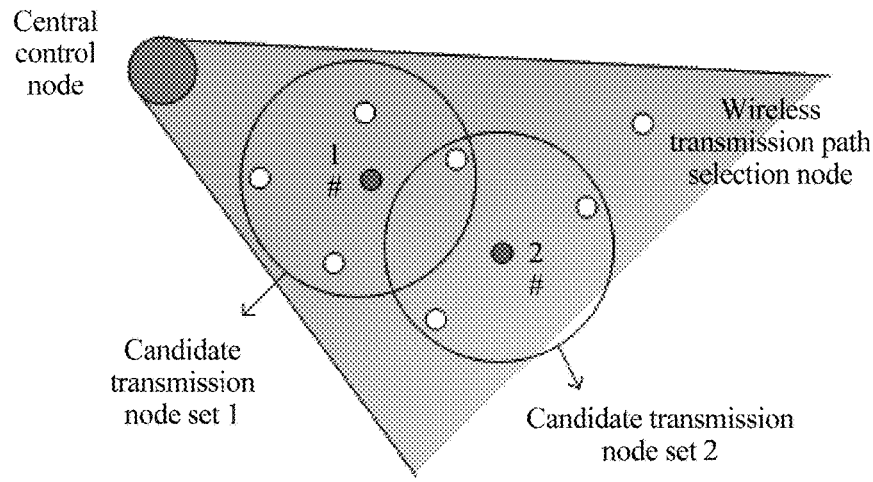
FIG. 2B is a schematic diagram of a candidate transmission node set according to an embodiment of the present invention.

Referring to FIG. 2A, in this embodiment of the present invention, a detailed wireless transmission path selection procedure is as follows:

Step 200: Determine precoding information of a transmission path between a wireless transmission path selection node and each candidate transmission node in a candidate transmission node set corresponding to the wireless transmission path selection node, and/or orthogonality information of channel propagation directions from any two candidate transmission nodes in the candidate transmission node set to the wireless transmission path selection node, where each candidate transmission node in the candidate transmission node set and the wireless transmission path selection node access a same central control node.

Step 210: Calculate a channel quality indicator CQI of each transmission path according to corresponding precoding information and/or corresponding orthogonality information.

Step 220: Determine a target transmission path of the wireless transmission path selection node according to the calculated CQI.

In this embodiment of the present invention, there are multiple execution bodies of steps 200 to 220, which for example, may be the central control node, or may be the wireless transmission path selection node itself, or certainly, may be another execution body, which is not described herein one by one in detail.

In this embodiment of the present invention, the candidate transmission node set may be set by the central control node for the wireless transmission path selection node, or may be selected by the wireless transmission path selection node according to a criterion, such as receive power from another node to the wireless transmission path selection node. As shown in 2B, the figure shows candidate transmission node sets of two wireless transmission path selection nodes (a wireless transmission path selection node 1# and a wireless transmission path selection node 2#).

In this embodiment of the present invention, a relationship among the central control node, the wireless transmission path selection node, and the candidate transmission node may be described as follows: The central control node manages several small cell nodes, and each small cell node may need to select a wireless transmission path. Therefore, each small cell node may be the wireless transmission path selection node. Each wireless transmission path selection node has a candidate transmission node set, and a candidate transmission node in the candidate transmission node set is selected according to a criterion (for example, a propagation loss from a target node to the wireless transmission path selection node is greater than a threshold), and is another small cell node managed by the same central control node, that is, each small cell node may be a candidate transmission node in a candidate transmission node set of another wireless transmission path selection node.

In this embodiment of the present invention, there are multiple manners for determining the precoding information of the transmission path between the wireless transmission path selection node and each candidate transmission node in the candidate transmission node set corresponding to the wireless transmission path selection node. For example, the following manner may be used:

separately performing the following operations for any transmission path:

determining a precoding indicator number of the any transmission path, and determining precoding information of the any transmission path according to the precoding indicator number.

In this embodiment of the present invention, there are multiple types of precoding information, which for example, may be receive end precoding information, or may be transmit end precoding information.

The receive end precoding information is receive end precoding information of a channel from a candidate transmission node to the wireless transmission path selection node. However, the receive end precoding information of the channel from the candidate transmission node to the wireless transmission path selection node may also be transmit end precoding information of a channel from the wireless transmission path selection node to the candidate transmission node.

Likewise, the transmit end precoding information is transmit end precoding information of a channel from a candidate transmission node to the wireless transmission path selection node.

It should be noted that in this embodiment of the present invention, names of a "receive end" and a "transmit end" are based on a situation in which the wireless transmission path selection node is used as a receive end. However, in practical application, the wireless transmission path selection node may be used as a transmit end, and in this case, the "receive end precoding information" still refers to the receive end precoding information of the channel from the candidate transmission node to the wireless transmission path selection node. Similarly, the "transmit end precoding information" still refers to the transmit end precoding information of the channel from the candidate transmission node to the wireless transmission path selection node.

In this embodiment of the present invention, the precoding indicator number is a receive end precoding indicator number and/or a transmit end precoding indicator number.

The receive end precoding indicator number is a receive end precoding indicator number of the channel from the candidate transmission node to the wireless transmission path selection node, and the transmit end precoding indicator number is a transmit end precoding indicator number of the channel from the candidate transmission node to the wireless transmission path selection node.

Similarly, in this embodiment of the present invention, names of a "receive end" and a "transmit end" are based on a situation in which the wireless transmission path selection node is used as a receive end. In practical application, if the wireless transmission path selection node is used as a transmit end, meanings of the foregoing names do not change.

In this embodiment of the present invention, when steps 200 to 220 are not executed by the wireless transmission path selection node, an execution body may further obtain the precoding information according to the precoding information reported by the wireless transmission path selection node. When reporting the precoding information, the wireless transmission path selection node may determine, according to a measurement feedback mode indication sent by the execution body, to report, to the execution body, the receive end precoding indicator number, or the transmit end precoding indicator number, or the receive end precoding indicator number and the transmit end precoding indicator number, so that the precoding information is determined according to the precoding indicator number.

That is, there are multiple manners for determining information about the transmission path between the wireless transmission path selection node and each candidate transmission node in the candidate transmission node set corresponding to the wireless transmission path selection node. For example, the following manner may be used:

sending a measurement feedback mode indication to the wireless transmission path selection node; and receiving a receive end precoding indicator number and/or a transmit end precoding indicator number that are/is of a transmission path between a candidate transmission node in the candidate transmission node set corresponding to the wireless transmission path selection node and the wireless transmission path selection node and that are/is fed back by the wireless transmission path selection node according to the measurement feedback mode indication.

In this embodiment of the present invention, there are multiple forms of the receive end precoding information. For example, the receive end precoding information may include left singular vector information and/or left singular matrix information that are/is of a channel matrix from the candidate transmission node in the candidate transmission node set to the wireless transmission path selection node.

The left singular vector information of the channel matrix from the candidate transmission node in the candidate transmission node set to the wireless transmission path selection node is right singular vector information of a channel matrix from the wireless transmission path selection node to the candidate transmission node in the candidate transmission node set, which are equivalent. Likewise, the left singular matrix information of the channel matrix from the candidate transmission node to the wireless transmission path selection node is right singular matrix information of the channel matrix from the wireless transmission path selection node to the candidate transmission node in the candidate transmission node set, which are equivalent.

The receive end precoding indicator number includes a left singular vector indicator number and/or a left singular matrix indicator number that are/is of the channel matrix from the candidate transmission node in the candidate transmission node set to the wireless transmission path selection node.

The left singular vector indicator number of the channel matrix from the candidate transmission node to the wireless transmission path selection node is a right singular vector indicator number of the channel matrix from the wireless transmission path selection node to the candidate transmission node in the candidate transmission node set, which are equivalent. Likewise, the left singular matrix indicator number of the channel matrix from the candidate transmission node to the wireless transmission path selection node is a right singular matrix indicator number of the channel matrix from the wireless transmission path selection node to the candidate transmission node in the candidate transmission node set, which are equivalent.

In this embodiment of the present invention, there are multiple forms of the transmit end precoding information. For example, the transmit end precoding information includes right-left singular vector information and/or right singular matrix information that are/is of the channel matrix from the candidate transmission node in the candidate transmission node set to the wireless transmission path selection node.

The right-left singular vector information of the channel matrix from the candidate transmission node to the wireless transmission path selection node is left singular vector information of the channel matrix from the wireless transmission path selection node to the candidate transmission node in the candidate transmission node set. Likewise, the right singular matrix information of the channel matrix from the candidate transmission node to the wireless transmission path selection node is left singular matrix information of the channel matrix from the wireless transmission path selection node to the candidate transmission node in the candidate transmission node set.

The transmit end precoding indicator number includes a right singular vector indicator number and/or a right singular matrix indicator number that are/is of the channel matrix from the candidate transmission node in the candidate transmission node set to the wireless transmission path selection node.

The right singular vector indicator number of the channel matrix from the candidate transmission node to the wireless transmission path selection node is a left singular vector indicator number of the channel matrix from the wireless transmission path selection node to the candidate transmission node in the candidate transmission node set. Likewise, the right singular matrix indicator number of the channel matrix from the candidate transmission node to the wireless transmission path selection node is a left singular matrix indicator number of the channel matrix from the wireless transmission path selection node to the candidate transmission node in the candidate transmission node set.

In this embodiment of the present invention, the precoding indicator number includes the receive end precoding indicator number and the transmit end precoding indicator number. The precoding indicator number needs to be determined according to a selected codebook and a channel, and the selected codebook is generally determined according to array configuration. Therefore, a codebook corresponding to the receive end precoding indicator number is different from a codebook corresponding to the transmit end precoding indicator number. The codebook corresponding to the receive end precoding indicator number is determined according to array configuration information of the wireless transmission path selection node, and the codebook corresponding to the transmit end precoding indicator number is determined according to array configuration information of a candidate transmission node corresponding to a corresponding transmission path.

That is, there are multiple manners for determining the precoding indicator number of the any transmission path, that is, there are multiple manners for determining a codebook corresponding to the precoding indicator number of the any transmission path. For example, the following manner may be used:

determining a receive end precoding indicator number of the any transmission path according to the array configuration information of the wireless transmission path selection node (that is, determining, according to the array configuration information of the wireless transmission path selection node, a codebook corresponding to the receive end precoding indicator number of the any transmission path); and/or determining a transmit end precoding indicator number of the transmission path according to the array configuration information of the candidate transmission node corresponding to the any transmission path (that is, determining, according to the array configuration information of the candidate transmission node corresponding to the any transmission path, a codebook corresponding to the transmit end precoding indicator number of the transmission path).

In this embodiment of the present invention, there are multiple forms of the array configuration information, for example, including:

an array configuration identifier (indicating a linear array, a rectangular array, a cylindrical array, a spherical array, a cubic array, or the like) and a total quantity of array antenna ports; or an array configuration identifier, a quantity of horizontal array ports, and a quantity of vertical array ports; or an array configuration identifier, a quantity of x-dimensional array ports, a quantity of y-dimensional array ports, and a quantity of z-dimensional array ports. Certainly, the array configuration information may further include another content, which is not described herein one by one in detail.

Further, in this embodiment of the present invention, to effectively identify a form of the array configuration information, the array configuration information further includes an array configuration information attribute identifier, and the array configuration information attribute identifier is used to indicate information included in the array configuration information.

For example, according to the array configuration information attribute identifier, it may be indicated that the array configuration information includes the array configuration identifier and the total quantity of array antenna ports, or includes the array configuration identifier, the quantity of horizontal array ports, and the quantity of vertical array ports, or includes the array configuration identifier, the quantity of x-dimensional array ports, the quantity of y-dimensional array ports, and the quantity of z-dimensional array ports.

In this embodiment of the present invention, when the wireless transmission path selection node performs receive end precoding indicator measurement, the following manner may be used:

determining a to-be-used codebook according to the array configuration information of the wireless transmission path selection node itself, obtaining receive end precoding information according to a measured channel from a candidate transmission node in the candidate transmission node set to the wireless transmission path selection node, and using the to-be-used codebook to quantize the receive end precoding information to obtain a receive end precoding indicator number.

In this embodiment of the present invention, when the central control node obtains the receive end precoding information according to the receive end precoding indicator number reported by the wireless transmission path selection node, the following manner may be used:

receiving array configuration information reported by all nodes (including the wireless transmission path selection node) controlled by the central control node; and then determining, according to the reported array configuration information, a codebook corresponding to the receive end precoding number of the wireless transmission path selection node, and determining receive end precoding information of a transmission path according to the corresponding codebook and a receive end precoding indicator number that is reported by the wireless transmission path selection node for the transmission path.

In this embodiment of the present invention, when the wireless transmission path selection node performs transmit end precoding indicator measurement, the following manner may be used:

determining a to-be-used codebook for a transmission path corresponding to each candidate transmission node according to array configuration information, of each candidate transmission node in the candidate transmission node set, notified by the central control node; and then obtaining transmit end precoding information according to a measured channel from a candidate transmission node in the candidate transmission node set to the wireless transmission path selection node, and using the corresponding codebook to quantize the transmit end precoding information to obtain a transmit end precoding indicator number.

In this embodiment of the present invention, when the central control node obtains the transmit end precoding information according to the transmit end precoding indicator number reported by the wireless transmission path selection node, the following manner may be used:

receiving array configuration information reported by all nodes controlled by the central control node; and determining the array configuration information according to reported candidate transmission node number information, so as to determine a corresponding codebook, and determining the transmit end precoding information of the transmission path according to the corresponding codebook and the transmit end precoding indicator number that is reported by the wireless transmission path selection node for the transmission path.

In this embodiment of the present invention, there are multiple manners for determining the orthogonality information of the channel propagation directions from the any two candidate transmission nodes in the candidate transmission node set to the wireless transmission path selection node. Optionally, the following manner may be used:

separately determining, for any transmission path, receive end precoding information of the any transmission path;

obtaining an orthogonality indicator number of the channel propagation directions from the any two candidate transmission nodes to the wireless transmission path selection node according to receive end precoding information of corresponding transmission paths; and determining the orthogonality information of the channel propagation directions from the any two candidate transmission nodes to the wireless transmission path selection node according to the orthogonality indicator number of the channel propagation directions.

In this embodiment of the present invention, there are multiple manners for determining the orthogonality information of the channel propagation directions from the any two candidate transmission nodes in the candidate transmission node set to the wireless transmission path selection node. Optionally, the following manner may be used:

sending a measurement feedback mode indication to the wireless transmission path selection node;

receiving an orthogonality indicator number that is of the channel propagation directions from the any two candidate transmission nodes in the candidate transmission node set to the wireless transmission path selection node and that is fed back by the wireless transmission path selection node according to the measurement feedback mode indication; and determining the orthogonality information of the channel propagation directions from the any two candidate transmission nodes in the candidate transmission node set to the wireless transmission path selection node according to the orthogonality indicator number of the channel propagation directions.

Certainly, there may be other manners, which is not described herein one by one in detail.

In this embodiment of the present invention, when a quantity of wireless transmission path selection nodes or candidate transmission node antenna ports is relatively large, and a quantity of candidate transmission nodes in the candidate transmission node set is relatively small (such as 3), compared with reporting the receive end precoding indicator number or the transmit end precoding indicator number, reporting the orthogonality indicator number of the channel propagation directions may save more signaling overheads for the wireless transmission path selection node. Otherwise, when both the quantity of wireless transmission path selection nodes and the quantity of candidate transmission node antenna ports are relatively small, or the quantity of candidate transmission nodes in the candidate transmission node set is relatively large (for example, more than 5), reporting the precoding indicator number may save more signaling overheads.

In this embodiment of the present invention, optionally, the orthogonality information of the channel propagation directions is a modulus value of an inner product result of left singular vectors corresponding to maximum singular values of channel matrices from either of two candidate transmission nodes to the wireless transmission path selection node; and/or a modulus value of an inner product result of right singular vectors corresponding to maximum singular values of channel matrices from the wireless transmission path selection node to either of the two candidate transmission nodes.

Likewise, in this embodiment of the present invention, the orthogonality indicator number of the channel propagation directions is a modulus value indicator number of the inner product result of the left singular vectors corresponding to the maximum singular values of the channel matrices from either of the two candidate transmission nodes to the wireless transmission path selection node; or a modulus value indicator number of the inner product result of the right singular vectors corresponding to the maximum singular values of the channel matrices from the wireless transmission path selection node to either of the two candidate transmission nodes.

That is, in this embodiment of the present invention, the orthogonality information of the channel propagation directions may be: performing an inner product operation on receive end precoding vectors of channels (that is, left singular vectors corresponding to maximum singular values of channel matrices) of transmission paths from two candidate transmission nodes to the wireless transmission path selection node, then performing a modulo operation to obtain a modulus value.

In this embodiment of the present invention, there are multiple methods for obtaining the orthogonality indicator number of the channel propagation directions. For example, an inner product operation on receive end precoding vectors of channels (that is, left singular vectors corresponding to maximum singular values of channel matrices) of transmission paths from two candidate transmission nodes to the wireless transmission path selection node may be performed, and a modulo operation and quantization are performed to obtain a corresponding indicator number. In this case, each indicator number corresponds to a specific modulus value obtained after the inner product operation, and the value is the orthogonality information of the channel propagation directions of the two corresponding transmission paths.

In this embodiment of the present invention, there are multiple manners for determining a CQI of any transmission path according to corresponding precoding information and/or corresponding orthogonality information of channel propagation directions. Optionally, the following manner may be used:

generating, according to the corresponding precoding information or the corresponding orthogonality information of the channel propagation directions, a receive end orthogonality value of channels from an interference source and a signal source to the wireless transmission path selection node, and a transmit end orthogonality value of channels from the interference source to the wireless transmission path selection node and a serving node of the interference source; and calculating, according to the receive end orthogonality value and the transmit end orthogonality value, an SINR (Signal to interference and noise Ratio, signal to interference plus noise ratio) of the any transmission path that is used to represent the CQI; where both the receive end orthogonality value and the transmit end orthogonality value are in a negative correlation to the SINR.

Certainly, the following manner may be alternatively used:

generating, according to the corresponding precoding information and/or the corresponding orthogonality information of the channel propagation directions, a receive end orthogonality value of channels from the wireless transmission path selection node and an interference source to a target node, and a transmit end orthogonality value of channels from the interference source to the target node and a serving node of the interference source; and calculating, according to the receive end orthogonality value and the transmit end orthogonality value, an SINR of the any transmission path that is used to represent the CQI; where both the receive end orthogonality value and the transmit end orthogonality value are in a negative correlation to the SINR.

In the foregoing process, according to the corresponding precoding information and/or the corresponding orthogonality information of the channel propagation directions, when the receive end orthogonality value of the channels from the interference source and the signal source to the wireless transmission path selection node and the transmit end orthogonality value of the channels from the interference source to the wireless transmission path selection node and the serving node of the interference source are generated, the wireless transmission path selection node is used as a receive end.

According to the corresponding precoding information and/or the corresponding orthogonality information of the channel propagation directions, when the receive end orthogonality value of the channels from the wireless transmission path selection node and the interference source to the target node and the transmit end orthogonality value of the channels from the interference source to the target node and the serving node of the interference source are generated, the wireless transmission path selection node is used as a transmit end.

In this embodiment of the present invention, when the SINR of the any transmission path that is used to represent the CQI is calculated according to the precoding information or the orthogonality information from the any two candidate transmission nodes to the wireless transmission path selection node, the following formula 1 may be used for calculation. In an application scenario of the formula 1, a node j# is a current wireless transmission path selection node, the node j# is a receive node, and a node i# is a transmit node.

$$\gamma_{i-j} = \frac{P_{s,i}\lambda_{i,j}}{\sum_{\substack{k=1 \\ k \neq i,j}}^{N_{intf}} P_{s,k}\lambda_{k,j}|v_{i,j}^H v_{k,j}|^2 |u_{k,j}^H u_{k,s(k)}|^2 + \sigma_{I+N}^2}. \quad \text{(Formula 1)}$$

The node j# is the current wireless transmission path selection node, and the node j# is the receive node.

The node i# is a candidate transmission node in a candidate transmission node set of the node j#, and is the transmit node.

$N_{intf}$ is a quantity of other nodes that have a same central control node as the node j# and the node i# (the node i# and the node j# access the same central control node).

$P_{s,k}$ is transmit power of a node k# ($1 \leq k \leq N_{intf}$).

$\lambda_{k,j}$ is a propagation loss from the node k# to the node j#.

$v_{k,j}$ is a left singular vector of a channel from the node k# to the node j# (that is, a receive end "precoding vector" or a channel direction in which the node k# is a transmit end and the node j# is a receive end).

$u_{k,j}$ is a right singular vector of the channel from the node k# to the node j# (that is, a transmit end "precoding vector" or a channel direction in which the node k# is the transmit end and the node j# is the receive end).

s(k) is a number of a serving node of the node k#.

$\sigma_{I+N}^2$ is interference and noise power (the interference refers to interference imposed on the wireless transmission path selection node by a node outside the transmission node set controlled by the central control node).

$|v_{i,j}^H v_{k,j}|^2$ is a receive end orthogonality value of channels from a signal source and an interference source to the wireless transmission path selection node, and if $v_{i,j}$ or $v_{k,j}$ is found useless during calculation of $|v_{i,j}^H v_{k,j}|^2$, $|v_{i,j}^H v_{k,j}|^2 = 1$.

$|u_{k,j}^H u_{k,s(k)}|^2$ is a transmit end orthogonality value of channels from the interference source to the wireless transmission path selection node and a serving node of the interference source. Similarly, if $u_{k,j}$ or $u_{k,s(k)}$ is found useless during calculation of $|u_{k,j}^H u_{k,s(k)}|^2$, $|u_{k,j}^H u_{k,s(k)}|^2 = 1$.

In practical application, alternatively, the node j# may be the transmit node. If the node j# is the current wireless transmission path selection node, the node j# is the transmit node, and the node i# is the receive node, the SINR may be calculated by using the formula 2:

$$\gamma_{j-i} = \frac{P_{s,j}\lambda_{j,i}}{\sum_{\substack{k=1 \\ k \neq i,j}}^{N_{intf}} P_{s,k}\lambda_{k,i}|v_{j,i}^H v_{k,i}|^2 |u_{k,i}^H u_{k,s(k)}|^2 + \sigma_{I+N}^2}. \quad \text{(Formula 2)}$$

The node j# is the current wireless transmission path selection node, and the node j# is the transmit node.

The node i# is a candidate transmission node in a candidate transmission node set of the node j#, and the node i# is the receive node.

$N_{intf}$ is a quantity of other nodes that have a same central control node as the node j# and the node i# (the node i# and the node j# access the same central control node).

$P_{s,k}$ is transmit power.

$\lambda_{k,j}$ is a propagation loss from the node k# to the node j# ($1 \leq k \leq N_{intf}$).

$v_{k,j}$ is a left singular vector of a channel from the node k# to the node j# (that is, a receive end "precoding vector" or a channel direction in which the node k# is a transmit end and the node j# is a receive end).

$u_{k,j}$ is a right singular vector of the channel from the node k# to the node j# (that is, a transmit end "precoding vector" or a channel direction in which the node k# is the transmit end and the node j# is the receive end).

s(k) is a number of a serving node of the node k#.

$\sigma_{I+N}^2$ is interference and noise power (the interference refers to interference generated by a node outside the transmission node set controlled by the central control node).

$|v_{j,i}^H v_{k,i}|^2$ is a receive end orthogonality value of channels from the wireless transmission path selection node and an interference source to a target node, and if $v_{j,i}$ or $v_{k,i}$ is found useless during calculation of $|v_{j,i}^H v_{k,i}|^2$, $|v_{j,i}^H v_{k,i}|^2 = 1$.

$|u_{k,i}^H u_{k,s(k)}|^2$ is a transmit end orthogonality value of channels from an interference source node to the target node and a serving node of the interference source node. Similarly, if $u_{k,i}$ or $u_{k,s(k)}$ is found useless during calculation of $|u_{k,i}^H u_{k,s(k)}|^2$, $|u_{k,i}^H u_{k,s(k)}|^2 = 1$.

In this embodiment of the present invention, there are multiple manners for determining the target transmission path of the wireless transmission path selection node according to the calculated CQI. Optionally, the following manner may be used:

using a transmission path corresponding to a maximum CQI as the target transmission path of the wireless transmission path selection node; or calculating a maximum throughput according to the CQI and a preset rule, and using a transmission path corresponding to a maximum throughput as the target transmission path of the wireless transmission path selection node.

Figure 3:
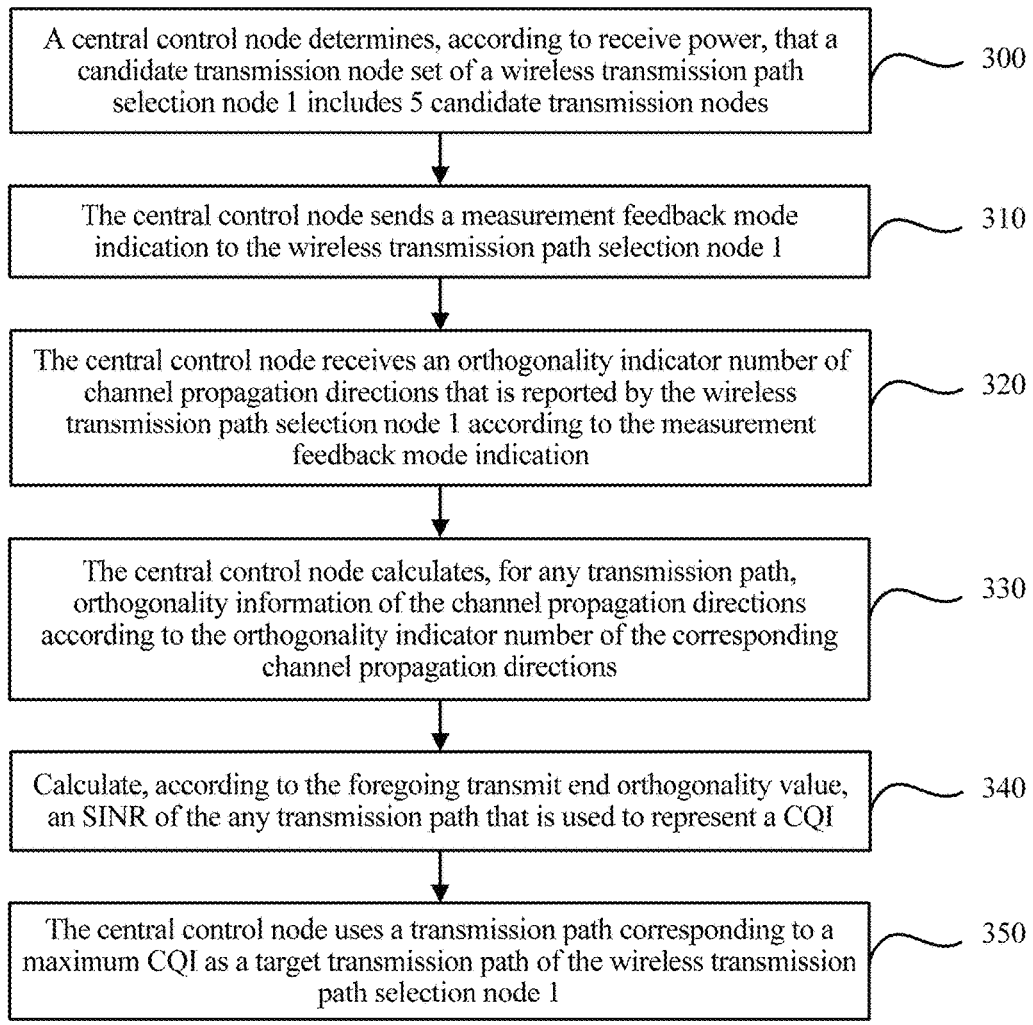
FIG. 3 is an embodiment of selection of a wireless transmission path according to an embodiment of the present invention.

To better understand this embodiment of the present invention, the following provides a specific application scenario and makes a further detailed description about a wireless transmission path transmission process, as shown in FIG. 3:

Step 300: A central control node determines, according to receive power, that a candidate transmission node set of a wireless transmission path selection node 1 includes 5 candidate transmission nodes.

Step 310: The central control node sends a measurement feedback mode indication to the wireless transmission path selection node 1.

Step 320: The central control node receives an orthogonality indicator number of channel propagation directions that is reported by the wireless transmission path selection node 1 according to the measurement feedback mode indication.

In this step, the orthogonality indicator number of the channel propagation directions is an orthogonality indicator number of channel propagation directions from any two candidate transmission nodes of 5 candidate transmission nodes in the candidate transmission node set to the wireless transmission path selection node 1.

Certainly, alternatively, in this step, a receive end precoding indicator number and/or a transmit end precoding indicator number may be reported. The receive end precoding indicator number and/or the transmit end precoding indicator number are/is a receive end precoding indicator number and/or a transmit end precoding indicator number that are/is of a transmission path between the wireless transmission path selection node 1 to each of the 5 candidate transmission nodes.

Step 330: The central control node calculates, for any transmission path, orthogonality information of channel propagation directions according to the corresponding orthogonality indicator number of the channel propagation directions.

Step 340: Calculate, according to the foregoing transmit end orthogonality value, an SINR of the any transmission path that is used to represent a CQI.

Step 350: The central control node uses a transmission path corresponding to a maximum CQI as a target transmission path of the wireless transmission path selection node 1.

In practical application, a maximum SINR corresponds to a maximum CQI.

Certainly, alternatively, the central control node may determine the target transmission path of the wireless transmission path selection node 1 in another manner.

Figure 4:
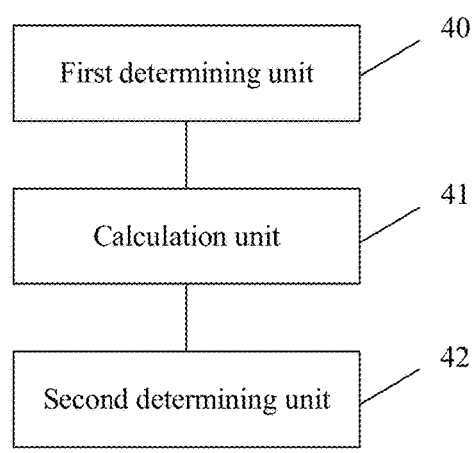
FIG. 4 is a schematic structural diagram of a function of a wireless transmission path selection apparatus according to an embodiment of the present invention.

Based on the foregoing technical solutions, referring to FIG. 4, an embodiment of the present invention provides a wireless transmission path selection apparatus. The wireless transmission path selection apparatus includes a first determining unit 40, a calculation unit 41, and a second determining unit 42.

The first determining unit 40 is configured to determine precoding information of a transmission path between a wireless transmission path selection node and each candidate transmission node in a candidate transmission node set corresponding to the wireless transmission path selection node, and/or orthogonality information of channel propagation directions from any two candidate transmission nodes in the candidate transmission node set to the wireless transmission path selection node, where each candidate transmission node in the candidate transmission node set and the wireless transmission path selection node access a same central control node.

The calculation unit 41 is configured to calculate, for each candidate transmission node, a channel quality indicator CQI of the transmission path between the candidate transmission node and the wireless transmission path selection node according to the determined precoding information and/or determined orthogonality information that are/is corresponding to the candidate transmission node.

The second determining unit 42 is configured to determine a target transmission path of the wireless transmission path selection node according to the calculated CQI of the transmission path between each candidate transmission node and the wireless transmission path selection node.

Optionally, in this embodiment of the present invention, the first determining unit 40 is specifically configured to:

for a transmission path between the wireless transmission path selection node and any candidate transmission node in the candidate transmission node set corresponding to the wireless transmission path selection node, separately perform the following operations:

determining a precoding indicator number of the transmission path; and determining precoding information of the transmission path according to the determined precoding indicator number and a correspondence between a precoding indicator number and precoding information.

Optionally, in this embodiment of the present invention, the precoding information determined by the first determining unit 40 includes receive end precoding information and/or transmit end precoding information.

The precoding indicator number determined by the first determining unit 40 includes a receive end precoding indicator number and/or a transmit end precoding indicator number.

Optionally, in this embodiment of the present invention, the first determining unit 40 is specifically configured to:

send a measurement feedback mode indication to the wireless transmission path selection node;

receive a receive end precoding indicator number and/or a transmit end precoding indicator number that are/is of a transmission path between a candidate transmission node in the candidate transmission node set corresponding to the wireless transmission path selection node and the wireless transmission path selection node and that are/is fed back by the wireless transmission path selection node according to the measurement feedback mode indication; and determine, according to a corresponding receive end precoding indicator number and/or a corresponding transmit end precoding indicator number, the precoding information of the transmission path between the wireless transmission path selection node and each candidate transmission node in the candidate transmission node set corresponding to the wireless transmission path selection node.

Optionally, in this embodiment of the present invention, the receive end precoding information included in the precoding information determined by the first determining unit 40 includes left singular vector information and/or left singular matrix information that are/is of a channel matrix from the candidate transmission node in the candidate transmission node set to the wireless transmission path selection node; and the receive end precoding indicator number included in the precoding indicator number determined by the first determining unit 40 includes a left singular vector indicator number and/or a left singular matrix indicator number that are/is of the channel matrix from the candidate transmission node in the candidate transmission node set to the wireless transmission path selection node.

Optionally, in this embodiment of the present invention, the transmit end precoding information included in the precoding information determined by the first determining unit 40 includes right-left singular vector information and/or right singular matrix information that are/is of the channel matrix from the candidate transmission node in the candidate transmission node set to the wireless transmission path selection node; and the transmit end precoding indicator number included in the precoding indicator number determined by the first determining unit 40 includes a right singular vector indicator number and/or a right singular matrix indicator number that are/is of the channel matrix from the candidate transmission node in the candidate transmission node set to the wireless transmission path selection node.

Optionally, in this embodiment of the present invention, that the first determining unit 40 determines the precoding indicator number of the transmission path is specifically:

determining a receive end precoding indicator number of the transmission path according to array configuration information of the wireless transmission path selection node; and/or determining a transmit end precoding indicator number of the transmission path according to array configuration information of a candidate transmission node corresponding to the transmission path.

Optionally, in this embodiment of the present invention, the array configuration information used when the first determining unit 40 determines the precoding indicator number of the transmission path includes:

an array configuration identifier and a total quantity of array antenna ports; or an array configuration identifier, a quantity of horizontal array ports, and a quantity of vertical array ports; or an array configuration identifier, a quantity of x-dimensional array ports, a quantity of y-dimensional array ports, and a quantity of z-dimensional array ports.

Optionally, in this embodiment of the present invention, the array configuration information used when the first determining unit 40 determines the precoding indicator number of the transmission path further includes an array configuration information attribute identifier, and the array configuration information attribute identifier is used to indicate information included in the array configuration information.

Optionally, in this embodiment of the present invention, the first determining unit 40 is specifically configured to:

separately determine, for any transmission path, receive end precoding information of the any transmission path;

obtain an orthogonality indicator number of the channel propagation directions from the any two candidate transmission nodes to the wireless transmission path selection node according to receive end precoding information of corresponding transmission paths; and determine the orthogonality information of the channel propagation directions from the any two candidate transmission nodes to the wireless transmission path selection node according to the orthogonality indicator number of the channel propagation directions and a correspondence between an orthogonality indicator number and orthogonality information.

Optionally, in this embodiment of the present invention, the first determining unit 40 is specifically configured to:

send a measurement feedback mode indication to the wireless transmission path selection node;

receive an orthogonality indicator number that is of the channel propagation directions from the any two candidate transmission nodes in the candidate transmission node set to the wireless transmission path selection node and that is fed back by the wireless transmission path selection node according to the measurement feedback mode indication; and determine the orthogonality information of the channel propagation directions from the any two candidate transmission nodes to the wireless transmission path selection node according to the orthogonality indicator number of the channel propagation directions and a correspondence between an orthogonality indicator number and orthogonality information.

Optionally, in this embodiment of the present invention, the orthogonality information of the channel propagation directions that is determined by the first determining unit 40 includes:

a modulus value of an inner product result of left singular vectors corresponding to maximum singular values of channel matrices from either of the two candidate transmission nodes to the wireless transmission path selection node; and/or a modulus value of an inner product result of right singular vectors corresponding to maximum singular values of channel matrices from the wireless transmission path selection node to either of the two candidate transmission nodes.

Optionally, in this embodiment of the present invention, the orthogonality indicator number of the channel propagation directions that is determined by the first determining unit 40 includes:

a modulus value indicator number of the inner product result of the left singular vectors corresponding to the maximum singular values of the channel matrices from either of the two candidate transmission nodes to the wireless transmission path selection node; or a modulus value indicator number of the inner product result of the right singular vectors corresponding to the maximum singular values of the channel matrices from the wireless transmission path selection node to either of the two candidate transmission nodes.

Optionally, in this embodiment of the present invention, the calculation unit 41 is specifically configured to:

generate, according to the determined precoding information and/or the determined orthogonality information that are/is corresponding to the candidate transmission node, a receive end orthogonality value of channels from an interference source and a signal source to the wireless transmission path selection node and a transmit end orthogonality value of channels from the interference source to the wireless transmission path selection node and a serving node of the interference source;

calculate a signal to interference plus noise ratio SINR of the transmission path according to the generated receive end orthogonality value of the channels and the generated transmit end orthogonality value of the channels; and determine the CQI of the transmission path according to the SINR obtained by means of calculation; where both the channel receive end orthogonality value and the channel transmit end orthogonality value are in a negative correlation to the SINR.

Optionally, in this embodiment of the present invention, the calculation unit 41 is specifically configured to:

generate, according to the determined precoding information and/or the determined orthogonality information that are/is corresponding to the candidate transmission node, a receive end orthogonality value of channels from the wireless transmission path selection node and an interference source to a target node and a transmit end orthogonality value of channels from the interference source to the target node and a serving node of the interference source;

calculate a signal to interference plus noise ratio SINR of the transmission path according to the generated receive end orthogonality value of the channels and the generated transmit end orthogonality value of the channels; and determine the CQI of the transmission path according to the SINR obtained by means of calculation; where both the channel receive end orthogonality value and the channel transmit end orthogonality value are in a negative correlation to the SINR.

Optionally, in this embodiment of the present invention, the second determining unit 42 is specifically configured to:

use a transmission path corresponding to a maximum CQI as the target transmission path of the wireless transmission path selection node; or calculate a maximum throughput of each transmission path according to the CQI of the transmission path between each candidate transmission node and the wireless transmission path selection node and according to a preset rule; and use a transmission path corresponding to a maximum CQI as the target transmission path of the wireless transmission path selection node.

Figure 5:
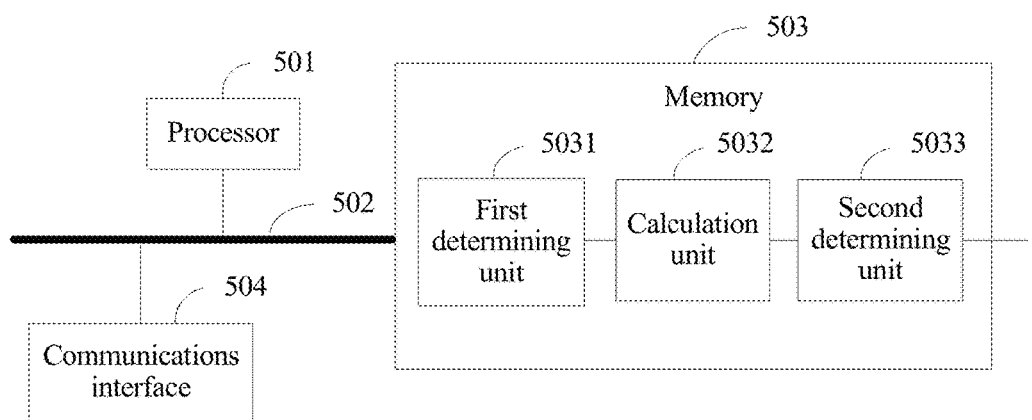
FIG. 5 is a schematic structural diagram of an entity of a wireless transmission path selection apparatus according to an embodiment of the present invention.

As shown in FIG. 5, FIG. 5 is a structural diagram of another first PCE according to an embodiment of the present invention, and the first PCE includes at least one processor 501, a communications bus 502, a memory 503, and at least one communications interface 504.

The communications bus 502 is configured to implement connection and communication between the foregoing components, and the communications interface 504 is configured to connect to and communicate with an external device.

The memory 503 is configured to store program code that needs to be executed, and the program code may specifically include a first determining unit 5031, a calculation unit 5032, and a second determining unit 5033. When the foregoing units are executed by the processor 501, the following functions are implemented:

The first determining unit 5031 is configured to determine precoding information of a transmission path between a wireless transmission path selection node and each candidate transmission node in a candidate transmission node set corresponding to the wireless transmission path selection node, and/or orthogonality information of channel propagation directions from any two candidate transmission nodes in the candidate transmission node set to the wireless transmission path selection node, where each candidate transmission node in the candidate transmission node set and the wireless transmission path selection node access a same central control node.

The calculation unit 5032 is configured to calculate, for each candidate transmission node, a channel quality indicator CQI of the transmission path between the candidate transmission node and the wireless transmission path selection node according to the determined precoding information and/or determined orthogonality information that are/is corresponding to the candidate transmission node.

The second determining unit 5033 is configured to determine a target transmission path of the wireless transmission path selection node according to the calculated CQI of the transmission path between each candidate transmission node and the wireless transmission path selection node.

In conclusion, in this embodiment of the present invention, precoding information of a transmission path between a wireless transmission path selection node and each candidate transmission node in a candidate transmission node set corresponding to the wireless transmission path selection node and/or orthogonality information of channel propagation directions from any two candidate transmission nodes in the candidate transmission node set to the wireless transmission path selection node are/is determined, where each candidate transmission node in the candidate transmission node set and the wireless transmission path selection node access a same central control node; a CQI of each transmission path is calculated according to corresponding precoding information and/or corresponding orthogonality information of the channel propagation directions; and a target transmission path of the wireless transmission path selection node is determined according to the CQI. In this solution, a CQI of each wireless transmission path is determined according to the corresponding precoding information and/or the corresponding orthogonality information of the channel propagation directions. The foregoing information indicates impact imposed by spatial beamforming on the CQI. Therefore, a capability of avoiding interference by the spatial beamforming is considered during wireless transmission path selection, improving accuracy of a determined wireless transmission path, and improving wireless resource utilization.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A wireless transmission path selection method, comprising:
    determining precoding information of a transmission path between a wireless transmission path selection node and each candidate transmission node in a candidate transmission node set corresponding to the wireless transmission path selection node, and/or orthogonality information of channel propagation directions from any two candidate transmission nodes in the candidate transmission node set to the wireless transmission path selection node, wherein each candidate transmission node in the candidate transmission node set and the wireless transmission path selection node access a same central control node, wherein the determining precoding information of a transmission path between a wireless transmission path selection node and each candidate transmission node in a candidate transmission node set corresponding to the wireless transmission path selection node specifically comprises:
        sending a measurement feedback mode indication to the wireless transmission path selection node;
        receiving a receive end precoding indicator number and/or a transmit end precoding indicator number that are/is of a transmission path between a candidate transmission node in the candidate transmission node set corresponding to the wireless transmission path selection node and the wireless transmission path selection node and that are/is fed back by the wireless transmission path selection node according to the measurement feedback mode indication; and
        determining, according to a corresponding receive end precoding indicator number and/or a corresponding transmit end precoding indicator number, the precoding information of the transmission path between the wireless transmission path selection node and each candidate transmission node in the candidate transmission node set corresponding to the wireless transmission path selection node;
    calculating, for each candidate transmission node, a channel quality indicator (CQI) of the transmission path between the candidate transmission node and the wireless transmission path selection node according to the determined precoding information and/or determined orthogonality information that are/is corresponding to the candidate transmission node; and
    determining a target transmission path of the wireless transmission path selection node according to the calculated CQI of the transmission path between each candidate transmission node and the wireless transmission path selection node.

2. The method according to claim 1, wherein the receive end precoding information comprises left singular vector information and/or left singular matrix information that are/is of a channel matrix from the candidate transmission node in the candidate transmission node set to the wireless transmission path selection node; and
    the receive end precoding indicator number comprises a left singular vector indicator number and/or a left singular matrix indicator number that are/is of the channel matrix from the candidate transmission node in the candidate transmission node set to the wireless transmission path selection node.

3. The method according to claim 1, wherein the determining a precoding indicator number of the transmission path comprises:
    determining a receive end precoding indicator number of the transmission path according to array configuration information of the wireless transmission path selection node; and/or
    determining a transmit end precoding indicator number of the transmission path according to array configuration information of a candidate transmission node corresponding to the transmission path.

4. The method according to claim 3, wherein the array configuration information comprises:
    an array configuration identifier and a total quantity of array antenna ports; or
    an array configuration identifier, a quantity of horizontal array ports, and a quantity of vertical array ports; or
    an array configuration identifier, a quantity of x-dimensional array ports, a quantity of y-dimensional array ports, and a quantity of z-dimensional array ports.

5. The method according to claim 4, wherein the array configuration information further comprises an array configuration information attribute identifier, and the array configuration information attribute identifier is used to indicate information comprised in the array configuration information.

6. A wireless transmission path selection method, comprising:
    determining precoding information of a transmission path between a wireless transmission path selection node and each candidate transmission node in a candidate transmission node set corresponding to the wireless transmission path selection node, and/or orthogonality information of channel propagation directions from any two candidate transmission nodes in the candidate transmission node set to the wireless transmission path selection node, wherein each candidate transmission node in the candidate transmission node set and the wireless transmission path selection node access a same central control node, the determining orthogonality;
    calculating, for each candidate transmission node, a channel quality indicator (CQI) of the transmission path between the candidate transmission node and the wireless transmission path selection node according to the determined precoding information and/or determined orthogonality information that are/is corresponding to the candidate transmission node; and
    determining a target transmission path of the wireless transmission path selection node according to the calculated CQI of the transmission path between each candidate transmission node and the wireless transmission path selection node, wherein the determining orthogonality information of channel propagation directions from any two candidate transmission nodes in the candidate transmission node set to the wireless transmission path selection node comprises:
    sending a measurement feedback mode indication to the wireless transmission path selection node;
    receiving an orthogonality indicator number that is of the channel propagation directions from the any two candidate transmission nodes in the candidate transmission node set to the wireless transmission path selection node and that is fed back by the wireless transmission path selection node according to the measurement feedback mode indication; and
    determining the orthogonality information of the channel propagation directions from the any two candidate transmission nodes to the wireless transmission path selection node according to the orthogonality indicator number of the channel propagation directions and a correspondence between an orthogonality indicator number and orthogonality information.

7. The method according to claim 6, wherein the orthogonality information of the channel propagation directions comprises:
    a modulus value of an inner product result of left singular vectors corresponding to maximum singular values of channel matrices from either of the two candidate transmission nodes to the wireless transmission path selection node; and/or
    a modulus value of an inner product result of right singular vectors corresponding to maximum singular values of channel matrices from the wireless transmission path selection node to either of the two candidate transmission nodes.

8. The method according to claim 7, wherein the orthogonality indicator number of the channel propagation directions comprises:
    a modulus value indicator number of the inner product result of the left singular vectors corresponding to the maximum singular values of the channel matrices from either of the two candidate transmission nodes to the wireless transmission path selection node; or
    a modulus value indicator number of the inner product result of the right singular vectors corresponding to the maximum singular values of the channel matrices from the wireless transmission path selection node to either of the two candidate transmission nodes.

9. A wireless transmission path selection method, comprising:
    determining precoding information of a transmission path between a wireless transmission path selection node and each candidate transmission node in a candidate transmission node set corresponding to the wireless transmission path selection node, and/or orthogonality information of channel propagation directions from any two candidate transmission nodes in the candidate transmission node set to the wireless transmission path selection node, wherein each candidate transmission node in the candidate transmission node set and the wireless transmission path selection node access a same central control node, the determining orthogonality;
    calculating, for each candidate transmission node, a channel quality indicator (CQI) of the transmission path between the candidate transmission node and the wireless transmission path selection node according to the determined precoding information and/or determined orthogonality information that are/is corresponding to the candidate transmission node; and
    determining a target transmission path of the wireless transmission path selection node according to the calculated CQI of the transmission path between each candidate transmission node and the wireless transmission path selection node, wherein the calculating a CQI of the transmission path according to the determined precoding information and/or determined orthogonality information that are/is corresponding to the candidate transmission node comprises:
    generating, according to the determined precoding information and/or the determined orthogonality information that are/is corresponding to the candidate transmission node, a receive end orthogonality value of channels from the wireless transmission path selection node and an interference source to a target node and a transmit end orthogonality value of channels from the interference source to the target node and a serving node of the interference source;
    calculating a signal to interference plus noise ratio (SINR) of the transmission path according to the generated receive end orthogonality value of the channels and the generated transmit end orthogonality value of the channels; and
    determining the CQI of the transmission path according to the SINR obtained by means of calculation; wherein both the receive end orthogonality value of the channels and the transmit end orthogonality value of the channels are in a negative correlation to the SINR.

10. A wireless transmission path selection apparatus, wherein the wireless transmission path selection apparatus comprising:
    a processor;
    a memory storing instructions which when executed by the processor cause the wireless transmission path selection apparatus to execute operations comprising:
    determining precoding information of a transmission path between a wireless transmission path selection node and each candidate transmission node in a candidate transmission node set corresponding to the wireless transmission path selection node, and/or orthogonality information of channel propagation directions from any two candidate transmission nodes in the candidate transmission node set to the wireless transmission path selection node, wherein each candidate transmission node in the candidate transmission node set and the wireless transmission path selection node access a same central control node;
    calculating for each candidate transmission node, a channel quality indicator (CQI) of the transmission path between the candidate transmission node and the wireless transmission path selection node according to the determined precoding information and/or determined orthogonality information that are/is corresponding to the candidate transmission node;
    determining a target transmission path of the wireless transmission path selection node according to the calculated CQI of the transmission path between each candidate transmission node and the wireless transmission path selection node;
    sending a measurement feedback mode indication to the wireless transmission path selection node;
    receiving a receive end precoding indicator number and/or a transmit end precoding indicator number that are/is of a transmission path between a candidate transmission node in the candidate transmission node set corresponding to the wireless transmission path selection node and the wireless transmission path selection node and that are/is fed back by the wireless transmission path selection node according to the measurement feedback mode indication; and determining, according to a corresponding receive end precoding indicator number and/or a corresponding transmit end precoding indicator number, the precoding information of the transmission path between the wireless transmission path selection node and each candidate transmission node in the candidate transmission node set corresponding to the wireless transmission path selection node.

11. The apparatus according to claim 10, wherein the receive end precoding information included in the precoding information determined by the determining comprises left singular vector information and/or left singular matrix information that are/is of a channel matrix from the candidate transmission node in the candidate transmission node set to the wireless transmission path selection node; and the receive end precoding indicator number included in the precoding indicator number determined by the first determining unit comprises a left singular vector indicator number and/or a left singular matrix indicator number that are/is of the channel matrix from the candidate transmission node in the candidate transmission node set to the wireless transmission path selection node.

12. The apparatus according to claim 10, wherein the memory storing further instructions which when executed by the processor cause the wireless transmission path selection apparatus to execute operations comprising:

determining a receive end precoding indicator number of the transmission path according to array configuration information of the wireless transmission path selection node; and/or determining a transmit end precoding indicator number of the transmission path according to array configuration information of a candidate transmission node corresponding to the transmission path.

13. The apparatus according to claim 12, wherein the array configuration information used when the determining determines the precoding indicator number of the transmission path comprises:

an array configuration identifier and a total quantity of array antenna ports; or an array configuration identifier, a quantity of horizontal array ports, and a quantity of vertical array ports; or an array configuration identifier, a quantity of x-dimensional array ports, a quantity of y-dimensional array ports, and a quantity of z-dimensional array ports.

14. The apparatus according to claim 13, wherein the array configuration information used when the determining determines the precoding indicator number of the transmission path further comprises an array configuration information attribute identifier, and the array configuration information attribute identifier is used to indicate information comprised in the array configuration information.

15. A wireless transmission path selection apparatus, wherein the wireless transmission path selection apparatus comprising:

a processor;

a memory storing instructions which when executed by the processor cause the wireless transmission path selection apparatus to execute operations comprising:

determining precoding information of a transmission path between a wireless transmission path selection node and each candidate transmission node in a candidate transmission node set corresponding to the wireless transmission path selection node, and/or orthogonality information of channel propagation directions from any two candidate transmission nodes in the candidate transmission node set to the wireless transmission path selection node, wherein each candidate transmission node in the candidate transmission node set and the wireless transmission path selection node access a same central control node;

calculating for each candidate transmission node, a channel quality indicator (CQI) of the transmission path between the candidate transmission node and the wireless transmission path selection node according to the determined precoding information and/or determined orthogonality information that are/is corresponding to the candidate transmission node;

determining a target transmission path of the wireless transmission path selection node according to the calculated CQI of the transmission path between each candidate transmission node and the wireless transmission path selection node;

sending a measurement feedback mode indication to the wireless transmission path selection node;

receiving an orthogonality indicator number that is of the channel propagation directions from the any two candidate transmission nodes in the candidate transmission node set to the wireless transmission path selection node and that is fed back by the wireless transmission path selection node according to the measurement feedback mode indication; and determining the orthogonality information of the channel propagation directions from the any two candidate transmission nodes to the wireless transmission path selection node according to the orthogonality indicator number of the channel propagation directions and a correspondence between an orthogonality indicator number and orthogonality information.

16. The apparatus according to claim 15, wherein the orthogonality information of the channel propagation directions comprises:

a modulus value of an inner product result of left singular vectors corresponding to maximum singular values of channel matrices from either of the two candidate transmission nodes to the wireless transmission path selection node; and/or a modulus value of an inner product result of right singular vectors corresponding to maximum singular values of channel matrices from the wireless transmission path selection node to either of the two candidate transmission nodes.

17. The apparatus according to claim 16, wherein the orthogonality indicator number of the channel propagation directions comprises:

a modulus value indicator number of the inner product result of the left singular vectors corresponding to the maximum singular values of the channel matrices from either of the two candidate transmission nodes to the wireless transmission path selection node; or a modulus value indicator number of the inner product result of the right singular vectors corresponding to the maximum singular values of the channel matrices from the wireless transmission path selection node to either of the two candidate transmission nodes.

18. A wireless transmission path selection apparatus, wherein the wireless transmission path selection apparatus comprising:

a processor;

a memory storing instructions which when executed by the processor cause the wireless transmission path selection apparatus to execute operations comprising:

determining precoding information of a transmission path between a wireless transmission path selection node and each candidate transmission node in a candidate transmission node set corresponding to the wireless transmission path selection node, and/or orthogonality information of channel propagation directions from any two candidate transmission nodes in the candidate transmission node set to the wireless transmission path selection node, wherein each candidate transmission node in the candidate transmission node set and the wireless transmission path selection node access a same central control node;

calculating for each candidate transmission node, a channel quality indicator (CQI) of the transmission path between the candidate transmission node and the wireless transmission path selection node according to the determined precoding information and/or determined orthogonality information that are/is corresponding to the candidate transmission node;

determining a target transmission path of the wireless transmission path selection node according to the calculated CQI of the transmission path between each candidate transmission node and the wireless transmission path selection node;

generating, according to the determined precoding information and/or the determined orthogonality information that are/is corresponding to the candidate transmission node, a receive end orthogonality value of channels from the wireless transmission path selection node and an interference source to a target node and a transmit end orthogonality value of channels from the interference source to the target node and a serving node of the interference source;

calculating a signal to interference plus noise ratio (SINR) of the transmission path according to the generated receive end orthogonality value of the channels and the generated transmit end orthogonality value of the channels; and determining the CQI of the transmission path according to the SINR obtained by means of calculation; wherein both the receive end orthogonality value of the channels and the transmit end orthogonality value of the channels are in a negative correlation to the SINR.

* * * * *